US009886136B2

(12) United States Patent
Park et al.

(10) Patent No.: US 9,886,136 B2
(45) Date of Patent: Feb. 6, 2018

(54) TOUCH SCREEN CONTROLLER USING ADAPTIVE FILTER CONTROL AND TOUCH SCREEN SYSTEM HAVING THE SAME

(71) Applicant: SAMSUNG ELECTRONICS CO., LTD., Suwon-si, Gyeonggi-Do (KR)

(72) Inventors: Jun Chul Park, Daegu (KR); Bum Soo Kim, Seoul (KR); Kyeong Gon Lee, Hwaseong-si (KR); Cha Dong Kim, Gwacheon-si (KR); San Ho Byun, Bucheon-si (KR); Jin Chul Lee, Seoul (KR); Yoon Kyung Choi, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 36 days.

(21) Appl. No.: 15/189,647

(22) Filed: Jun. 22, 2016

(65) Prior Publication Data

US 2016/0370949 A1 Dec. 22, 2016

Related U.S. Application Data

(60) Provisional application No. 62/182,914, filed on Jun. 22, 2015.

(30) Foreign Application Priority Data

Mar. 10, 2016 (KR) .................... 10-2016-0029120

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ............................... G06F 3/0418; G06F 3/044
See application file for complete search history.

(56) References Cited

U.S. PATENT DOCUMENTS

| 8,217,917 | B2 | 7/2012 | Hill et al. |
| 8,907,897 | B2 | 12/2014 | Ferren et al. |
| 2006/0214921 | A1* | 9/2006 | Takahashi ............. G06F 3/0436 345/173 |
| 2011/0285654 | A1 | 11/2011 | Park et al. |

(Continued)

*Primary Examiner* — Insa Sadio
(74) *Attorney, Agent, or Firm* — F. Chau & Associates, LLC

(57) ABSTRACT

A touch screen controller controlling a capacitive touch screen includes a first comparator that compares a reference signal with a sensing signal, and generates a first output signal. The capacitive touch screen includes capacitive touch sensors connected to a sensing line and a drive line, and that sense a touch event. The sensing signal is output from the sensing line. The touch screen controller further includes a filter that generates a second output signal by integrating the first output signal in each sensing cycle of the filter, an analog-to-digital converter that converts the second output signal to a digital signal, and a controller that determines at least one of whether a noise is generated and whether the touch event is generated based on a reference digital signal and the digital signal, and that adjusts the number of the sensing cycles of the filter based on a result of the determination.

18 Claims, 10 Drawing Sheets

(56) References Cited

U.S. PATENT DOCUMENTS

| | | | |
|---|---|---|---|
| 2012/0056834 A1* | 3/2012 | Kim | G06F 3/0418 345/173 |
| 2013/0176269 A1 | 7/2013 | Sobel et al. | |
| 2013/0176272 A1 | 7/2013 | Cattivelli et al. | |
| 2014/0152614 A1 | 6/2014 | Choi et al. | |
| 2014/0287794 A1 | 9/2014 | Akhi et al. | |

* cited by examiner

TOUCH SCREEN CONTROLLER USING ADAPTIVE FILTER CONTROL AND TOUCH SCREEN SYSTEM HAVING THE SAME

CROSS-REFERENCE TO RELATED APPLICATIONS

This application claims priority under 35 U.S.C. § 119 to U.S. Provisional Patent Application No. 62/182,914 filed on Jun. 22, 2015, and to Korean Patent Application No. 10-2016-0029120 filed on Mar. 10, 2016, the disclosures of which are hereby incorporated by reference in their entireties.

TECHNICAL FIELD

Exemplary embodiments of the present inventive concept relate to a touch screen controller, and more particularly, to a touch screen controller for adjusting the number of sensing cycles of a filter according to whether an external noise is detected, which may reduce power consumption and/or increase an operation dynamic range, and a touch screen system having the touch screen controller.

DISCUSSION OF THE RELATED ART

A touch screen is an input device disposed on a display of an electronic device. A user may control the electronic device and provide input to the electronic device by touching the touch screen using a special stylus, or one or more fingers.

A touch screen may be a resistive touch screen, a capacitive touch screen, a mutual capacitance touch screen, or a self-capacitance touch screen. A touch screen controller is electrically connected to the touch screen. The touch screen controller includes a sensing circuit for sensing a touch signal sensed by at least one of a plurality of touch sensors included in the touch screen. When at least one of the touch sensors is touched by a conductor, an external noise is introduced into the sensing circuit through the conductor. Since the external noise is introduced into the sensing circuit, the sensing circuit includes a filter for distinguishing the touch signal from the external noise.

The performance of sensing circuits can be improved by including a high-performance filter having an increased external noise cancellation effect in the sensing circuits. However, a high-performance filter has an increased physical size, and when utilized in a sensing circuit, results in a sensing circuit having an increased physical size. If a sensing circuit does not include a high-performance filter, the time taken to cancel an external noise is increased, the filter consumes more current, and a response speed is reduced.

SUMMARY

An exemplary embodiment of the present inventive concept is directed to a touch screen controller which controls a capacitive touch screen including capacitive touch sensors connected to a sensing line and a drive line and sensing a touch event of the capacitive touch screen. The touch screen controller includes a first comparator for comparing a reference signal with a sensing signal output from the sensing line and generating a first output signal, a filter for generating a second output signal by integrating the first output signal in each sensing cycle, and an analog-to-digital converter (ADC) for converting the second output signal to a digital signal. The touch screen controller further includes a controller for determining at least one of whether a noise is generated and whether the touch event is generated based on a reference digital signal and the digital signal, and adjusting the number of the sensing cycles of the filter based on a result of the determination.

According to exemplary embodiments, the controller sets the number of the sensing cycles to a first value in response to determining that the noise is not generated, and sets the number of the sensing cycles to a second value in response to determining that the noise is generated. The first value is smaller than the second value.

According to exemplary embodiments, the controller sets the number of the sensing cycles to a first value in response to determining that the noise generated is present in a window defined by reference values, and sets the number of the sensing cycles to a second value in response to determining that the noise generated is present outside the window. The first value is smaller than the second value.

According to exemplary embodiments, the controller sets the number of the sensing cycles to a first value in response to determining that the touch event is not generated, and sets the number of the sensing cycles to a second value in response to determining that the touch event is generated. The first value is smaller than the second value.

According to exemplary embodiments, the touch screen controller further includes a drive circuit for transmitting drive pulses to the drive line in each drive cycle, in which the controller outputs a control signal to the drive circuit based on a result of the determination and the drive circuit adjusts the number of the drive cycles in response to the control signal. The number of the sensing cycles is equal to the number of the drive cycles.

According to exemplary embodiments, the controller sets the number of the drive cycles to a first value using the control signal in response to determining that the noise generated is present in a window defined by reference values, and sets the number of the drive cycles to a second value using the control signal in response to determining that the noise generated is present outside the window. The first value is smaller than the second value.

According to exemplary embodiments, the filter includes a first capacitor which includes a first terminal connected to an output terminal of the first comparator, a first switch which is connected between a second terminal of the first capacitor and a ground, a second comparator which includes a first input terminal and a second input terminal, a second switch which is connected between the second terminal and the first input terminal, a second capacitor which is connected between the first input terminal and an output terminal of the second comparator, and a reset switch which is connected to the second capacitor in parallel. The total number of times that each of the first switch, the second switch, and the reset switch is toggled is determined according to the number of the sensing cycles.

According to exemplary embodiments, the ADC converts the second output signal output from the filter to the digital signal in each of the sensing cycles, and the controller accumulates the digital signal output from the ADC in each of the sensing cycles and generates a final digital signal by dividing the accumulated digital signals by the number of the sensing cycles.

According to exemplary embodiments, the controller determines at least one of whether the noise is generated and whether the touch event is generated based on the reference digital signal and the digital signal of a current frame, and adjusts the number of the sensing cycles for a next frame based on a result of the determination.

An exemplary embodiment of the present inventive concept is directed to a touch screen system including a capacitive screen which includes capacitive touch sensor connected to a sensing line and a drive line and a touch screen controller which is electrically connected to the capacitive touch screen. The touch screen controller includes a first comparator for comparing a reference signal with a sensing signal output from the sensing line and generating a first output signal, a filter for generating a second output signal by integrating the first output signal in each sensing cycle, an ADC for converting the second output signal to a digital signal, and a controller for determining at least one of whether a noise is generated and whether a touch event is generated and adjusting the number of sensing cycles based on a result of the determination.

An exemplary embodiment of the present inventive concept is directed to a touch screen system including a capacitive touch screen which includes capacitive touch sensors connected to a sensing line and a drive line, and a touch screen controller which is electrically connected to the capacitive touch screen through the sensing line and the drive line. The touch screen controller includes a first comparator for comparing a reference signal with a sensing signal output from the sensing line in each first sensing cycle of a current frame and generating a first output signal, a filter for generating a second output signal by integrating the first output signal in the each first sensing cycle, a drive circuit for transmitting drive pulses to the drive line in each drive cycle of the current frame, and an ADC for converting the second output signal to a digital signal in the each first sensing cycle. The touch screen controller further includes a controller for determining at least one of whether a noise is generated and whether a touch event is generated based on a reference digital signal and the digital signal of the current frame, and adjusting at least one of the number of second sensing cycles of a next frame and the number of second drive cycles of the next frame based on a result of the determination.

According to exemplary embodiments, the controller sets the number of the second sensing cycles to a first value in response to determining that the noise generated is present in a window defined by reference values, and sets the number of the second sensing cycles to a second value in response to determining that the noise generated is present outside the window. The first value is smaller than the second value.

An exemplary embodiment of the present inventive concept is directed to a method of controlling a capacitive touch screen. The method includes comparing a reference signal with a sensing signal, by a first comparator, and generating a first output signal, by the first comparator, based on a comparison result obtained by comparing the reference signal with the sensing signal. The capacitive touch screen includes a plurality of capacitive touch sensors connected to a sensing line and a drive line. The capacitive touch sensors are configured to sense a touch event. The sensing signal is output from the sensing line. The method further includes generating a second output signal, by a filter, by integrating the first output signal in each of a plurality of sensing cycles of the filter. The method further includes converting the second output signal to a digital signal, by an analog-to-digital converter (ADC). The method further includes determining, by a controller, at least one of whether a noise is generated and whether the touch event is generated based on a reference digital signal and the digital signal, and adjusting, by the controller, a number of the sensing cycles of the filter based on a result of the determination.

According to exemplary embodiments, the method further includes setting the number of the sensing cycles, by the controller, to a first value in response to determining that the noise is not generated, and setting the number of the sensing cycles, by the controller, to a second value in response to determining that the noise is generated. The first value is smaller than the second value.

According to exemplary embodiments, the method further includes setting the number of the sensing cycles, by the controller, to a first value in response to determining that the touch event is not generated, and setting the number of the sensing cycles, by the controller, to a second value in response to determining that the touch event is generated. The first value is smaller than the second value.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EMBODIMENTS

Figure 1:
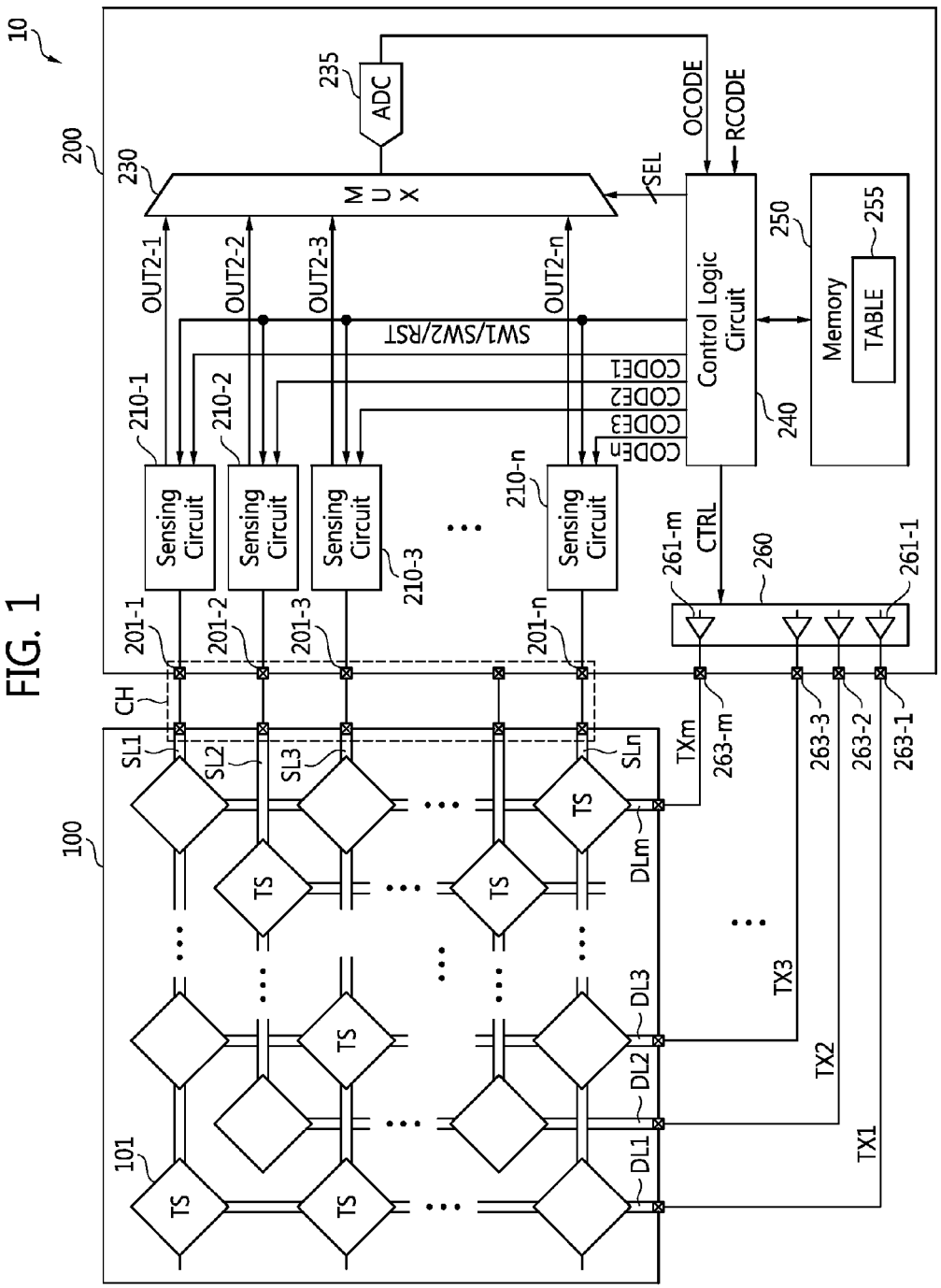
FIG. 1 is a block diagram of a touch screen system including a touch screen controller according to an exemplary embodiment of the inventive concept.

Exemplary embodiments of the present inventive concept will be described more fully hereinafter with reference to the accompanying drawings. In the drawings, the size and relative sizes of layers and regions may be exaggerated for clarity. Like reference numerals may refer to like elements throughout the accompanying drawings.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

FIG. 1 is a block diagram of a touch screen system 10 including a touch screen controller 200 according to exemplary embodiments of the present inventive concept. Referring to FIG. 1, the touch screen system 10 includes a touch screen 100 and the touch screen controller 200. The touch screen system 10 may refer to, for example, a personal computer (PC), an electronic voting machine, a smart car, an electric car, an automotive system, or a mobile device. However, the touch screen system 10 is not limited thereto. The touch screen 100 may refer to, for example, a touch screen panel.

The mobile device may be embodied as, for example, a laptop computer, a mobile phone, a smartphone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an Internet of Things (IoT) device, an Internet of Everything (IoE) device, a drone, or an e-book. However, the mobile device is not limited thereto.

The touch screen 100 may include a plurality of sensing elements. The sensing elements may be, for example, capacitive touch sensors TS. Each of the capacitive touch sensors TS may be embodied as, for example, a touch sensor using mutual capacitance.

The touch screen controller 200 may cancel offset capacitance of each of the capacitive touch sensors TS included in the touch screen 100. The offset capacitance refers to capacitance generated by one or more of the capacitive touch sensors TS.

Although the exemplary embodiment described with reference to FIG. 1 refers to the capacitive touch screen 100 using a mutual capacitive sensing method, a method of canceling offset capacitance of a sensing element (for example, a touch sensor) according to exemplary embodiments of the inventive concept is not limited thereto.

In an exemplary embodiment, the capacitive touch sensors TS are connected to sensing lines SL1 to SLn, where n is a natural number equal to at least four. The sensing lines SL1 to SLn are used for sensing each touch (also referred to as a touch event). The capacitive touch sensors TS are also connected to drive lines DL1 to DLm, where m is a natural number equal to at least four. The drive lines DL1 to DLm are used for transmitting drive signals TX1 to TXm. A line refers to a transmission medium such as, for example, a metal line.

In an exemplary embodiment, the touch screen controller 200 is embodied as an additional integrated circuit (IC) different from a display driver IC for driving a display panel. In an exemplary embodiment, the touch screen controller 200 is embodied in the same IC as the display driver IC. For example, a touch screen controller block for performing a function of the touch screen controller 200 and a display driver block for performing a function of the display driver IC may be embodied in a single semiconductor chip.

The touch screen controller 200 may include a plurality of sensing circuits 210-1 to 210-$n$, a selection circuit 230, an analog-to-digital converter (ADC) 235, a control logic circuit 240, and a memory device 250. The touch screen controller 200 may further include a drive circuit 260.

The touch screen controller 200 is connected to the touch screen 100 through a channel CH. For example, pins 201-1 to 201-$n$ included in the touch screen controller 200 may be connected to the sensing lines SL1 to SLn disposed in the touch screen 100 through lines forming the channel CH, and pins 263-1 to 263-$m$ included in the touch screen controller 200 may be connected to the drive lines DL1 to DLm disposed in the touch screen 100 through lines.

The plurality of sensing circuits 210-1 to 210-$n$ are the same as or similar to one another in structure and operation. Thus, the structure and an operation of a first sensing circuit 210-1 will be representatively described herein, and a further description of each separate sensing circuit will be omitted.

Offset cancellation time refers to the time required for canceling the offset capacitance of each of the capacitive touch sensors TS during a calibration step, or the time required for canceling the offset capacitance of a capacitive touch sensor TS to process a touch of a user.

During a first offset cancellation time, when a first driver 261-1 included in the drive circuit 260 drives (e.g., transmits) a first drive signal TX1 to a first drive line DL1, a signal corresponding to the offset capacitance of each of the capacitive touch sensors TS connected to the first drive line DL1 is supplied to each of the plurality of sensing circuits 210-1 to 210-$n$ through the corresponding sensing lines SL1 to SLn.

During the first offset cancellation time, each of the plurality of sensing circuits 210-1 to 210-$n$ generates corresponding second output signals OUT2-1 to OUT2-$n$, which are used to cancel the offset capacitance of each of the capacitive touch sensors TS disposed in a first column defined by the first drive line DL1.

The selection circuit 230 sequentially outputs each of the second output signals OUT2-1 to OUT2-$n$ to the ADC 235 in response to selection signals SEL. The ADC 235 sequentially generates a plurality of output digital signals OCODE, each corresponding to one of the second output signals OUT2-1 to OUT2-$n$.

The control logic circuit 240 performs a function of a code generator for generating each of digital signals CODE1 to CODEn. During a calibration operation, the control logic circuit 240 changes each of the digital signals CODE1 to CODEn until a reference digital signal RCODE is equal to each of output digital signals OCODE (each of which correspond to one of the second output signals OUT2-1 to OUT2-$n$). A digital signal herein may include a plurality of bits. Each of the plurality of bits may be expressed by logic 1 (for example, data 1 or a high level) or logic 0 (for example, data 1 or a low level). The digital signal may refer to a digital code including a plurality of bits.

For example, the control logic circuit 240 may change a first digital signal CODE1 until the reference digital signal RCODE is equal to an output digital signal OCODE corresponding to a second output signal OUT2-1. Similarly, the control logic circuit 240 may change an $n^{th}$ digital signal CODEn until the reference digital signal RCODE is equal to an output digital signal OCODE corresponding to an $n^{th}$ output signal OUT2-$n$.

In an exemplary embodiment, the reference digital signal RCODE corresponds to half of a maximum value of the output digital code OCODE. However, the reference digital signal RCODE is not limited thereto. For example, when the maximum value of the output digital code OCODE is expressed by a binary number corresponding to a decimal number of 2047, the reference digital code RCODE may be expressed by a binary number corresponding to a decimal number of 1023.

During the calibration operation, the control logic circuit 240 outputs each of the digital signals CODE1 to CODEn determined when the reference digital signal RCODE is equal to each of the output digital signals OCODE corresponding to each of the second output signals OUT2-1 to OUT2-$n$ to each of the sensing circuit 210-1 to 210-$n$, or stores each of the digital signals CODE1 to CODEn in the memory device 250.

For example, the control logic circuit 240 may output a first digital signal CODE1 determined when the reference digital signal RCODE is equal to an output digital signal OCODE corresponding to the second output signal OUT2-1 to the sensing circuit 210-1, or may store the first digital signal CODE1 in the memory device 250. Similarly, the control logic circuit 240 may output an $n^{th}$ digital signal CODEn determined when the reference digital signal RCODE is equal to an output digital signal OCODE corresponding to the second output signal OUT2-$n$ to a sensing circuit 210-$n$, or may store the $n^{th}$ digital signal in the memory device 250. The memory device 250 may be embodied as, for example, a static random access memory (SRAM). However, the memory device 250 is not limited thereto.

During an $m^{th}$ offset cancellation time, when a $m^{th}$ driver 261-$m$ included in the drive circuit 260 drives (e.g., transmits) an $m^{th}$ drive signal TXm to an $m^{th}$ drive line DLm, a signal corresponding to the offset capacitance of each of the capacitive touch sensors TS connected to the $m^{th}$ drive line DLm for transmitting the $m^{th}$ drive signal TXm is supplied to each of the plurality of sensing circuits 210-1 to 210-$n$ through the corresponding sensing lines SL1 to SLn.

During the $m^{th}$ offset cancellation time, each of the plurality of sensing circuits 210-1 to 210-$n$ generates the second output signals OUT2-1 to OUT2-$n$ used to cancel the offset capacitance of each of the capacitive touch sensors TS disposed in an $m^{th}$ column defined by the $m^{th}$ drive line DLm.

The selection circuit 230 may sequentially output each of the second output signals OUT2-1 to OUT2-$n$ to the ADC 235 in response to the selection signals SEL. The ADC 235 may sequentially generate each of the output digital signals OCODE corresponding to the second output signals OUT2-1 to OUT2-$n$.

During the calibration operation, the control logic circuit 240 changes each of the digital signals CODE1 to CODEn until the reference digital signal RCODE is equal to each of the output digital signals OCODE corresponding to each of the second output signals OUT2-1 to OUT2-$n$. For example, the control logic circuit 240 may change the first digital signal CODE1 until the reference digital signal RCODE is equal to the output digital signal OCODE corresponding to the second output signal OUT2-1. Similarly, the control logic circuit 240 may change an $n^{th}$ digital signal CODEn until the reference digital signal RCODE is equal to an output digital signal OCODE corresponding to the $n^{th}$ output signal OUT2-$n$.

During the calibration operation, the control logic circuit 240 outputs each of the digital signals CODE1 to CODEn determined when the reference digital signal RCODE is equal to each of the output digital signals OCODE corresponding to each of the second output signals OUT2-1 to OUT2-$n$ to each of the sensing circuits 210-1 to 210-$n$, or stores each of the digital signals CODE1 to CODEn in the memory device 250. For example, the control logic circuit 240 may output the first digital signal CODE1 determined when the reference digital signal RCODE is equal to the output digital signal OCODE corresponding to the second output signal OUT2-1 to the sensing circuit 210-1, or may store the first digital signal CODE1 in the memory device 250. Similarly, the control logic circuit 240 may output the $n^{th}$ digital signal CODEn determined when the reference digital signal RCODE is equal to the output digital signal OCODE corresponding to the second output signal OUT2-$n$ to the sensing circuit 210-$n$, or may store the $n^{th}$ digital signal CODEn in the memory device 250.

In an exemplary embodiment, respective offset cancellation times for each column defined by each of the drive lines DL1 to DLm do not overlap one another. During the respective offset cancellation times, each of the drive signals TX1 to TXm may have a drive cycle the same as the number of sensing cycles of a corresponding filter included in each of the sensing circuits 210-1 to 210-$n$. However, exemplary embodiments of the inventive concept are not limited thereto.

The selection circuit 230 may be embodied as, for example, a multiplexer operating in response to the selection signals SEL. However, the selection circuit 230 is not limited thereto. That is, the selection circuit 230 may control an output timing of each of the second output signals OUT2-1 to OUT2-$n$ of the sensing circuits 210-1 to 210-$n$ in response to the selection signals SEL.

The control logic circuit 240 may include a function of a code generator for generating each of the digital codes CODE1 to CODEn. During the calibration operation, the control logic circuit 240 changes each of the digital codes CODE1 to CODEn until the reference digital signal RCODE is equal to each of the output digital signals OCODE corresponding to each of the second output signals OUT2-1 to OUT2-$n$ output by column of the touch screen 100.

The control logic circuit 240 may generate the selection signals SEL and a control signal CTRL for controlling the drive circuit 260. The drive circuit 260 may control the number of drive (or driving) cycles of each of the drive signals TX1 to TXm in response to the control signal CTRL. Each of the drive signal TX1 to TXm may include drive pulses in each drive cycle of each of the drive signals TX1 to TXm.

The drive circuit 260 may include the plurality of drivers 261-1 to 261-$m$. Each of the plurality of drivers 261-1 to 261-$m$ may transmit each of the drive signals TX1 to TXm to the corresponding drive lines DL1 to DLm through the drive pins 263-1 to 263-$m$. For example, each of the plurality of drivers 261-1 to 261-$m$ may control the number of drive cycles of each of the drive signals TX1 to TXm in response to the control signal CTRL.

During each calibration operation, the control logic circuit 240 may generate each of the digital signals CODE1 to CODEn for canceling the offset capacitance of each of the capacitive touch sensors TS included in each column, and may store each of the digital signals CODE1 to CODEn in the memory device 250 in the form of a table 255.

For example, during each calibration operation or after the calibration operation is completed, the control logic circuit 240 may store each of the digital signals CODE1 to CODEn for canceling the offset capacitance of each of the capacitive touch sensors TS included in the touch screen panel 100 in a non-volatile memory device (e.g., a flash-based memory device). In an exemplary embodiment, the non-volatile memory device is disposed outside of the touch screen controller 200. However, exemplary embodiments of the inventive concept are not limited thereto. The flash-based memory device may be, for example, a NAND-type flash memory device or a NOR-type flash memory device. However, the flash-based memory device is not limited thereto.

After the calibration operation is completed (or after the touch screen controller 200 is packaged and sold), when the touch screen controller 200 included in the touch screen system 10 is booted, the control logic circuit 240 of the touch screen controller 200 may load each of the digital signals CODE1 to CODEn for canceling the offset capacitance of each of the capacitive touch sensors TS included in the touch screen panel 100 stored in the non-volatile memory device onto the memory device 250.

According to exemplary embodiments of the inventive concept, after the calibration operation is completed, the touch screen system 10 including the touch screen panel 100 and the touch screen controller 200 is booted, and the offset capacitance of each of the capacitive touch sensors TS included in the touch screen panel 100 may be canceled using each of the digital signals CODE1 to CODEn loaded onto the memory device 250 from the non-volatile memory device, resulting in an improved touch screen system 10.

Figure 2:
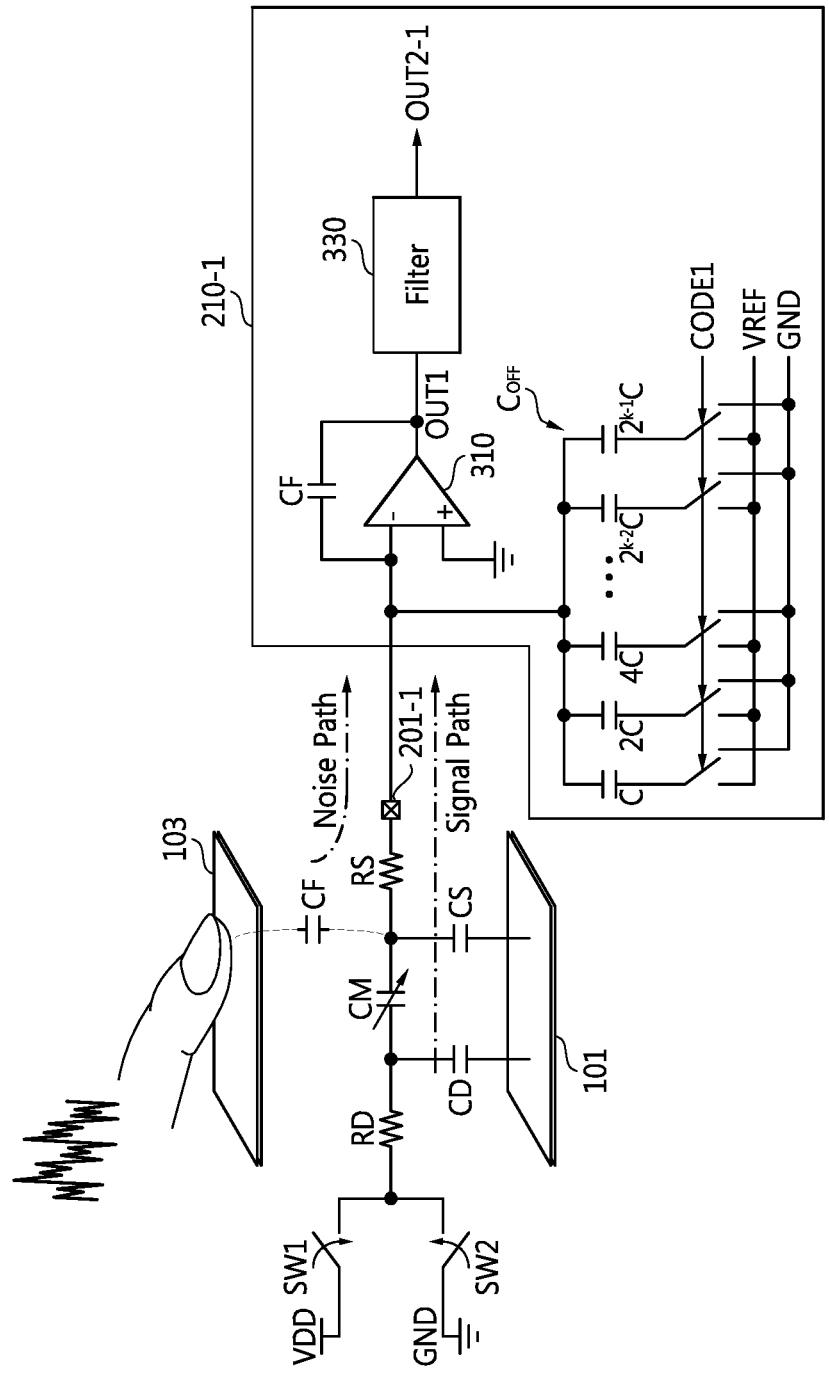
FIG. 2 illustrates the first sensing circuit shown in FIG. 1 and an operation of the first sensing circuit according to an exemplary embodiment of the inventive concept.

FIG. 2 illustrates the first sensing circuit shown in FIG. 1 and an operation of the first sensing circuit according to an exemplary embodiment of the inventive concept. It is assumed that the first touch sensor 101 shown in FIG. 2 is touched by a user, and that the first touch sensor 101 shown in FIG. 2 is disposed in a first row and a first column on the touch screen 100 of FIG. 1.

In FIG. 2, CF is finger capacitance when a finger of a user touches a transparent substrate 103 disposed on or above a first touch sensor 101, CM is mutual capacitance between the first touch sensor 101 and touch sensor(s) from among the touch sensors TS that are near the first touch sensor 101, RD is a resistance value between the drive line DL1 and the first touch sensor 101, CD is capacitance between the drive line DL1 and the first touch sensor 101, RS is a resistance value between the first touch sensor 101 and the first sensing line SL1, and CS is capacitance between the first touch sensor 101 and the first sensing line SL1.

The first sensing circuit 210-1 may include a first comparator 310, an offset capacitor cancellation circuit COFF, and a filter 330. The filter 330 may also be referred to herein as an integrator 330 or an integration filter 330.

When a finger of a user or a conductor touches the transparent substrate 103 disposed on or above the first touch sensor 101, a sensing signal and a noise generated by the touch are supplied to the first comparator 310 though a first pin 201-1.

The first comparator 310 compares a reference signal with the sensing signal and generates a first output signal OUT1. The reference signal may be, for example, a ground voltage. However, the reference signal is not limited thereto. The first comparator 310 may compare the sensing signal input to a first input terminal (−) and a ground voltage input to a second input terminal (+), and output a comparison signal (e.g., the first output signal OUT1), through an output terminal of the first comparator 310. The capacitor CF may be connected between the first input terminal (−) and the output terminal of the first comparator 310.

The offset capacitor cancellation circuit COFF may include k capacitors and k switches. Each capacitance C to $2^{k-1}C$ of each of the k capacitors may have a weighted value. Each of the k switches connected to the k capacitors may be connected to a first metal line for supplying a first voltage VREF or a second metal line for supplying a second voltage GND based on each of k bits included in the first digital signal CODE1. The first voltage VREF is higher than the second voltage GND. The offset capacitor cancellation circuit COFF may cancel the offset capacitance of each of the touch sensors TS connected to the first sensing line SL1 using different first digital signals CODE1 at different times. The filter 330 may integrate the first output signal OUT1 in each of a plurality of sensing cycles, and may generate and output an integration signal (e.g., a second output signal OUT2-1).

Figure 3:
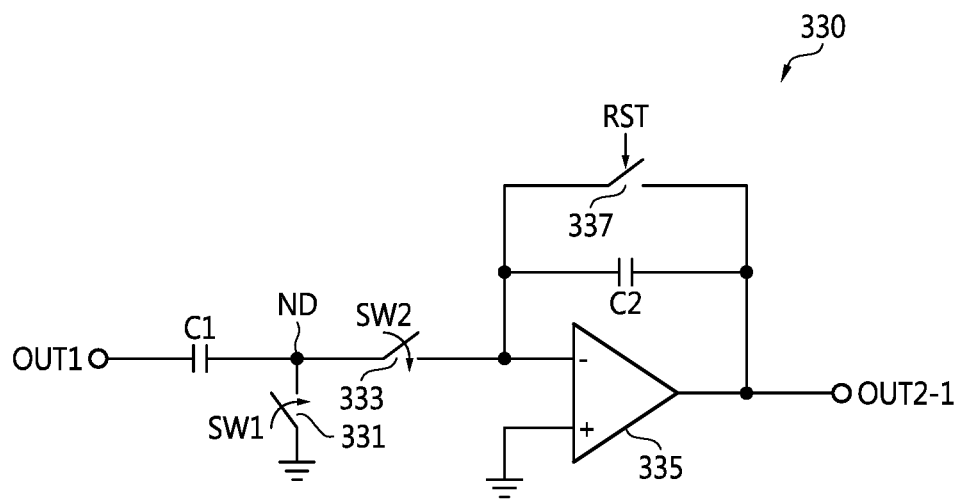
FIG. 3 is a circuit diagram of the filter shown in FIG. 2 according to an exemplary embodiment of the inventive concept.

FIG. 3 is a circuit diagram of the filter shown in FIG. 2 according to an exemplary embodiment of the inventive concept. Referring to FIG. 3, the filter 330 may include a first capacitor C1, a first switch 331, a second switch 333, a second comparator 335, a second capacitor C2, and a reset switch 337. The filter 330 may perform a function of an integrator for integrating the first output signal OUT1, or a function of sampling and holding the first output signal OUT1.

The first capacitor C1 is connected between an output terminal of the first comparator 310 and a node ND, the first switch 331 is connected between the node ND and a ground GND, the second switch 333 is connected between the node ND and a first input terminal (−) of the second comparator 335, the second capacitor C2 is connected between the first input terminal (−) and an output terminal of the second comparator 335, and the reset switch 337 is connected to the second capacitor C2 in parallel.

The first switch 331 controls a connection between the node ND and the ground GND in response to a first switch signal SW1, the second switch 333 controls a connection between the node ND and the first input terminal (−) of the second comparator 335 in response to a second switch signal SW2, and the reset switch 337 controls a reset operation of the second capacitor C2 in response to a reset signal RST. The first switch signal SW1 and the second switch signal SW2 may be, for example, complementary signals having a non-overlap interval. The total number of times that each of the first switch 331, the second switch 333, and the reset switch 337 is toggled (e.g., switches between an on state and an off state) is determined according to the number of the sensing cycles.

Figure 4:
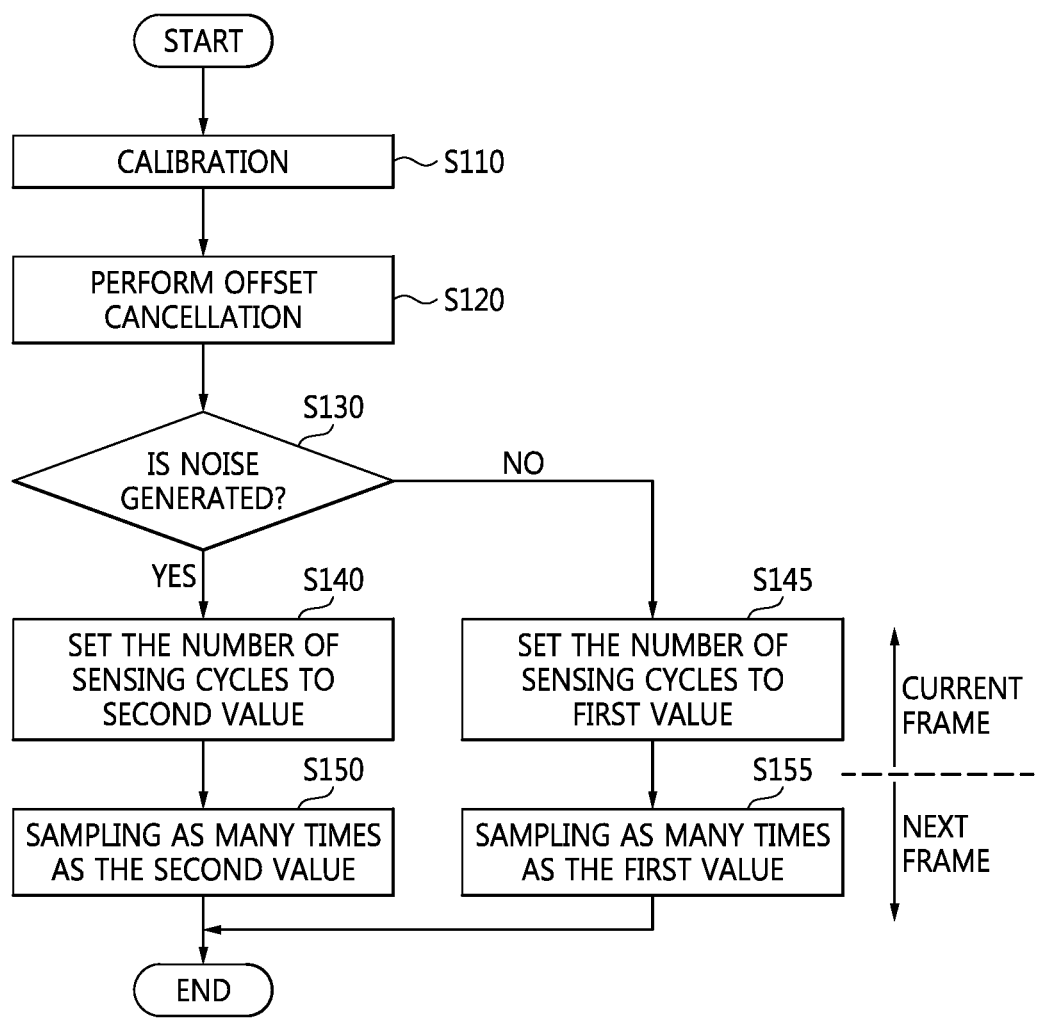
FIG. 4 is a flowchart illustrating an operation of the first sensing circuit shown in FIG. 1 according to an exemplary embodiment of the inventive concept.

FIG. 4 is a flowchart illustrating an operation of the first sensing circuit shown in FIG. 1 according to an exemplary embodiment of the inventive concept. Referring to FIGS. 1 to 4, a calibration operation for the first sensing circuit 210-1 is performed (S110), and an offset capacitance canceling operation is performed (S120). According to exemplary embodiments, operations S110 and S120 may be performed simultaneously or sequentially, and performance of the operations may or may not overlap. According to exemplary embodiments, operation S110 may be performed prior to operation S120, or operation S120 may be performed prior to operation S110. According to exemplary embodiments, the calibration operation S110 may be omitted (e.g., the calibration operation S110 may be performed in advance).

As described above, in an exemplary embodiment, after the offset capacitance canceling operation S120 is completed (e.g., after booting), the first comparator 310 receives a reference signal and a sensing signal output from the sensing line SL1, compares the signals, and generates a first output signal OUT1. The filter 330 integrates the first output signal OUT1 in each sensing cycle (for example, a sensing cycle set for a previous frame) and generates a second output signal OUT2-1. The selection circuit 230 outputs the second output signal OUT2-1 to the ADC 235 in response to the selection signals SEL.

The ADC 235 converts the second output signal OUT2-1 to an output digital signal OCODE. The control logic circuit 240 determines at least one of whether a noise is generated and whether an event is generated based on the reference digital signal RCODE and a digital signal OCODE output from the ADC 230. The control logic circuit 240 then adjusts the number of sensing cycles of the filter 330 based on a result of the determination.

Noise may be generated regardless of whether a touch event is generated, and noise may also be generated along with the generation of the touch event.

The control logic circuit 240 determines whether noise is generated based on the reference digital signal RCODE and the digital signal OCODE corresponding to the second output signal OUT2-1 (S130).

When noise is not generated, the reference digital signal RCODE is equal to the digital signal OCODE corresponding to the second output signal OUT2-1. That is, since the total capacitance of the offset capacitor cancellation circuit COFF is adjusted or determined by the first digital signal CODE1, a digital signal OCODE should be equal to the reference digital signal RCODE when noise is not generated.

However, when noise is generated, the reference digital signal RCODE is not equal to the digital signal OCODE corresponding to the second output signal OUT2-1. Here, the term equal may refer to being completely equal, or substantially equal within an error tolerance. The error tolerance may be determined by a manufacturer or a seller of the touch screen controller 200. The error tolerance may be stored in a non-volatile memory device which can be accessed by the control logic circuit 240.

Figure 8:
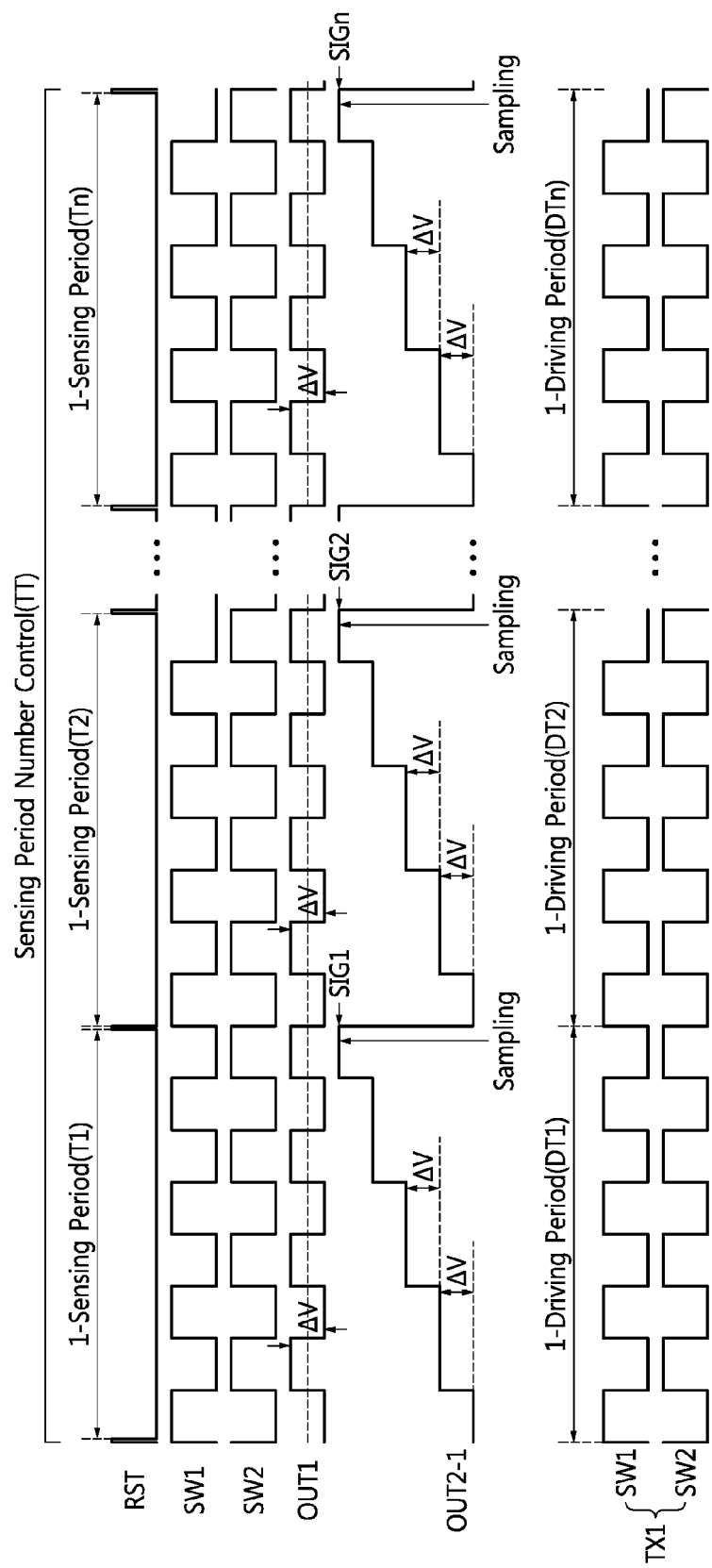
FIG. 8 is a timing diagram illustrating an operation of the first sensing circuit shown in FIG. 1 when the number of sensing cycles of the filter shown in FIG. 3 is a second value, according to an exemplary embodiment of the inventive concept.

When it is determined that noise is generated at S130, the control logic circuit 240, which may also be referred to herein as the controller 240, sets the number of sensing cycles of the filter 330 (e.g., the number of sensing cycles for a next frame) to a second value (S140). Accordingly, as shown in FIG. 8, the filter 330 may perform a sampling operation as many times as the second value in a next frame (S150). That is, in an exemplary embodiment, when it is determined that noise is generated, the number of times that the sampling operation is performed is equal to the second value.

Figure 6:
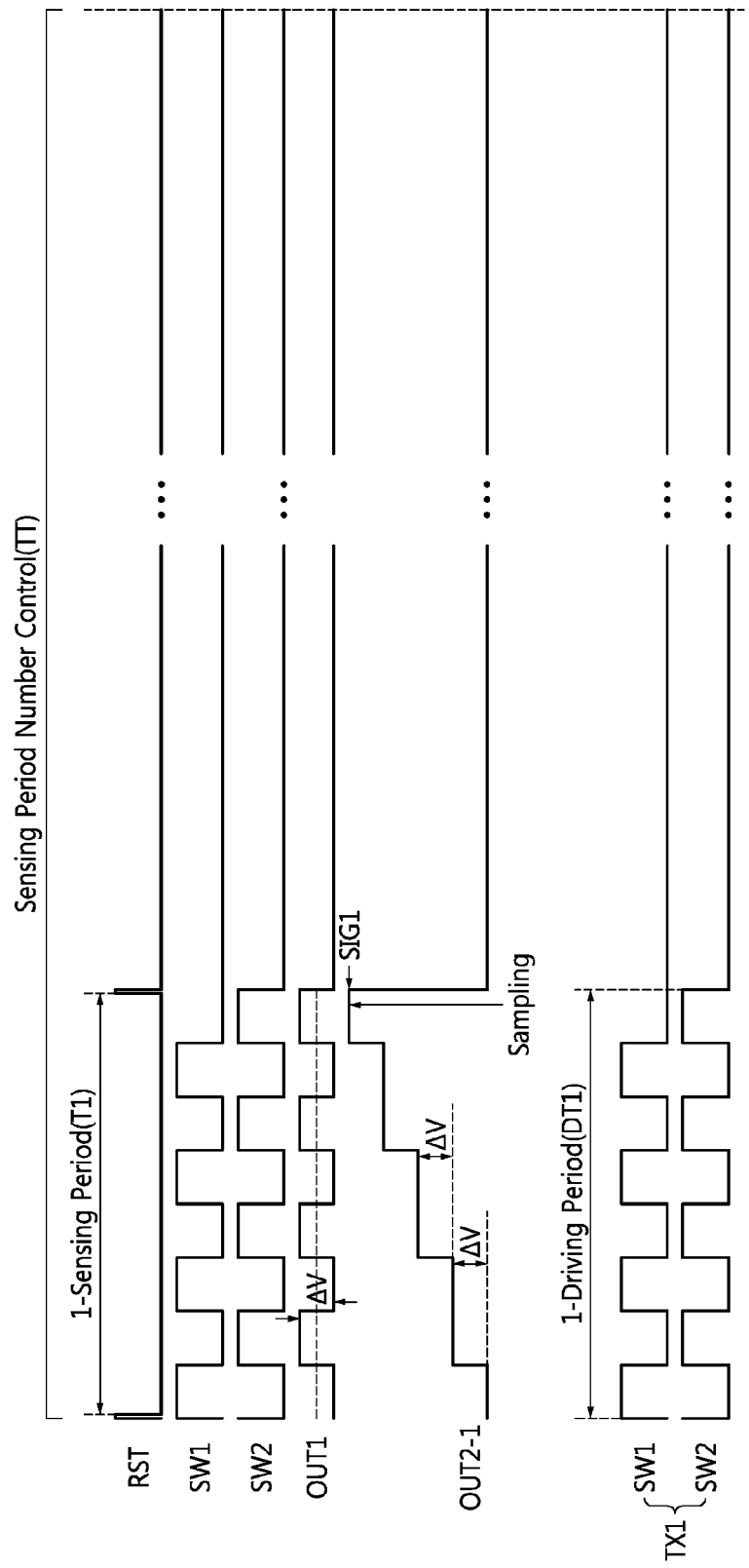
FIG. 6 is a timing diagram illustrating an operation of the first sensing circuit shown in FIG. 1 when the number of sensing cycles of the filter shown in FIG. 3 is a first value, according to an exemplary embodiment of the inventive concept.
Figure 7:
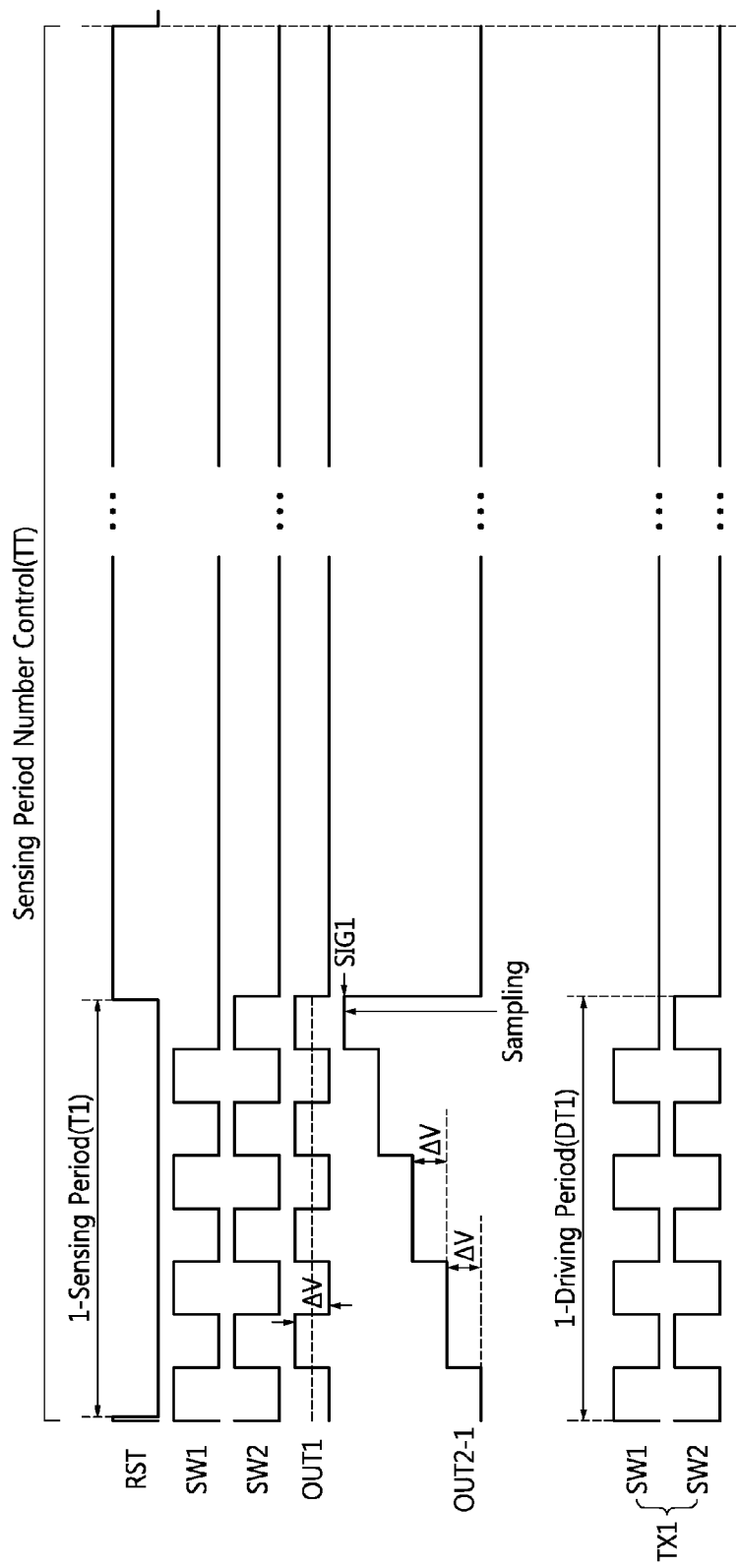
FIG. 7 is a timing diagram illustrating an operation of the first sensing circuit shown in FIG. 1 when the number of sensing cycles of the filter shown in FIG. 3 is a first value, according to an exemplary embodiment of the inventive concept.

When it is determined that noise is not generated at S130, the control logic circuit 240 sets the number of sensing cycles of the filter 330 (e.g., the number of sensing cycles for a next frame) to a first value (S145). Accordingly, the filter 330 may perform a sampling operation as many times as the first value in a next frame, as shown in FIG. 6 or 7 (S155). That is, in an exemplary embodiment, when it is determined that noise is not generated, the number of times that the sampling operation is performed is equal to the first value. The first value is smaller than the second value. When noise is not generated, the filter 330 performs a filtering operation (e.g., an integration operation) as many times as the number of sensing cycles corresponding to the first value. That is, in an exemplary embodiment, when it is determined that noise is not generated, the number of times that the filter 330 performs the filtering operation (e.g., the integration operation) is equal to the first value, which is smaller than the second value. As a result, according to exemplary embodiments, the touch screen controller 200 consumes less power.

Figure 5:
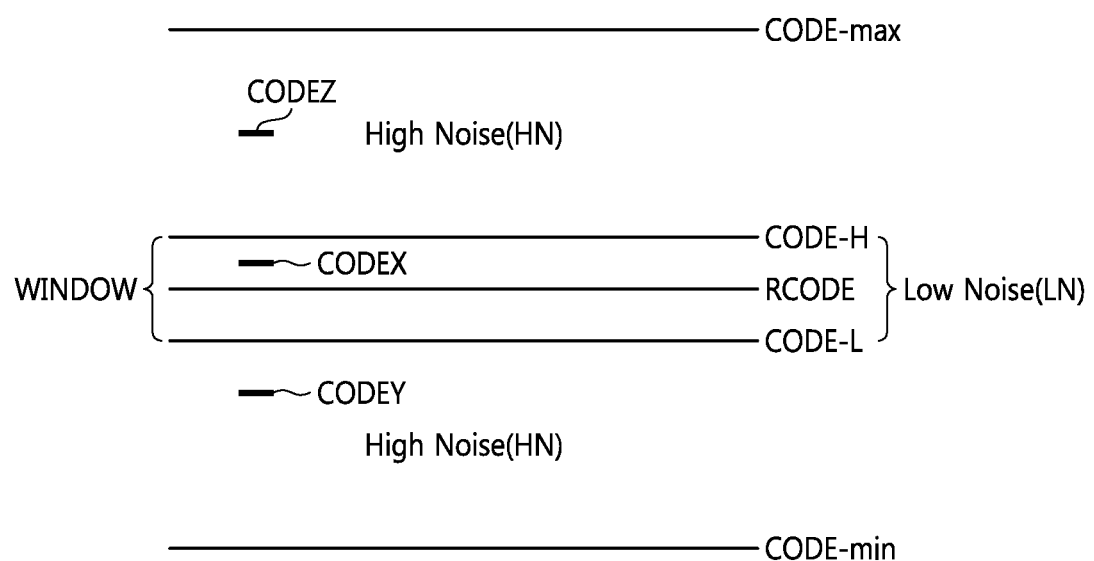
FIG. 5 shows a process of determining whether noise that is present is a low noise or a high noise according to an exemplary embodiment of the inventive concept.

FIG. 5 shows a process of determining whether noise that is present is a low noise or a high noise according to an exemplary embodiment of the present inventive concept. Referring to FIG. 5, when, even if noise is generated, an output digital signal OCOME (=CODEX) corresponding to the noise is present in a window WINDOW defined by reference values CODE-L and CODE-H, the controller 240 sets the number of sensing cycles of the filter 330 for a next frame as a first value.

The first value may be stored in the memory device 250 or stored in a memory device which can be accessed by the controller 240 by, for example, firmware executed by the controller 240. The memory device may be embodied inside or outside of the controller 240. The memory device may be, for example, a cache or a register. However, the memory device is not limited thereto. The controller 240 may be embodied as, for example, a central processing unit (CPU) or a processor.

When noise is generated and an output digital signal OCODE (=CODEY or CODEZ) corresponding to the noise is present outside the window WINDOW, the controller 240 sets the number of sensing cycles of the filter 330 for a next frame as a second value. The second value may be stored in the memory device 250 or stored in the memory device which can be accessed by the controller 240 by the firmware executed by the controller 240, as described above.

An upper reference digital signal CODE-H is larger than the reference digital signal RCODE, and a lower reference digital signal CODE-L is smaller than the reference digital signal RCODE. A first difference between the upper reference digital signal CODE-H and the reference digital signal RCODE may be the same as or different from a second difference between the reference digital signal RCODE and the lower reference digital signal CODE-L.

The reference digital signal RCODE may be an average value of a minimum value CODE-min of the output digital signal OCODE and a maximum value CODE-max of the output digital signal OCODE. However, a method of setting the reference digital signal RCODE may be variously changed.

When the output digital signal OCODE (=CODEX) is present in the window WINDOW, noise is referred to as a low noise LN or a weak noise. When the output digital signal OCODE (=CODEY or CODEZ) is present outside the window WINDOW, noise is referred to as a high noise ISN or a strong noise. When it is determined that a low noise LN is generated, the controller 240 may determine that noise is not generated. That is, referring to FIG. 4, when it is determined that a low noise LN is generated, the operation of the first sensing circuit 210-1 proceeds from operation S130 to S145. When it is determined that a high noise HN is generated, the controller 240 may determine that noise is generated. That is, referring to FIG. 4, when it is determined that a high noise HN is generated, the operation of the first sensing circuit 210-1 proceeds from operation S130 to S140.

FIG. 6 is a timing diagram illustrating an operation of the first sensing circuit shown in FIG. 1 when the number of sensing cycles of the filter shown in FIG. 3 is a first value, according to an exemplary embodiment of the inventive concept. Referring to FIGS. 1 to 6, when it is determined that noise has not been introduced into the first sensing circuit 210-1 by the controller 240 in a previous frame, or when noise introduced into the first sensing circuit 210-1 in the previous frame is determined to be a low noise, it is assumed that the controller 240 sets the number of sensing cycles of the filter 330 for a current frame to be equal to a first value. In an exemplary embodiment, the first value is 1.

The controller 240 or firmware executed by the controller 240 may generate a reset signal RST and switch signals SW1 and SW2 shown in FIG. 6 for a current frame using the first value determined in a previous frame.

The filter 330 is reset by the reset signal RST before performing the first sensing cycle T1. A reset operation is performed when the reset signal RST transitions from a high level to a low level. When a reset operation is performed, a sensing signal sensed by the first touch sensor 101 is periodically supplied to the first sensing circuit 210-1 through the first sensing line SL1 by a first drive signal TX1 supplied to the first drive line DL1 during a first drive cycle DT1.

As shown in FIG. 6, in an exemplary embodiment, the first drive signal TX1 includes switch signals SW1 and SW2. As shown in FIG. 2, an operation voltage VDD is alternately supplied to a resistor RD by the first switch signal SW1, and a ground voltage is alternately supplied to the resistor RD by the second switch signal SW2.

As the first drive signal TX1 oscillating in the first drive cycle DT1 is supplied to the first drive line DL1, a sensing signal sensed by the first touch sensor 101 is periodically supplied to the first comparator 310 through the first sensing line SL1 and the first pin 201-1 in the first sensing cycle T1.

The first comparator 310 in the first sensing cycle T1 periodically outputs a first output signal OUT1 having a swing width (or range) ΔV to the filter 330.

The filter 330 in the first sensing cycle T1 integrates the first output signal OUT1 periodically transmitted from the first comparator 310, and outputs a first integration signal SIG1 sampled at a sampling time Sampling as the second output signal OUT2-1 using switches 331 and 333 operating according to switch signals SW1 and SW2 having waveforms shown in FIG. 6.

The ADC 235 may convert the second output signal OUT2-1 (=SIG1) to an output digital signal OCODE, and the controller 240 may generate data corresponding to the output digital signal OCODE.

After the sampling time Sampling, the reset switch 337 is turned on due to the activation of the reset signal RST. As a result, charges integrated (or charged) in the second capacitor C2 are discharged to a ground GND. That is, the filter 330 is reset. After the first sensing cycle T1, the switches 331 and 333 are turned off. As a result, power is not consumed due to switching operations of the switches 331 and 333.

FIG. 7 is a timing diagram illustrating an operation of the first sensing circuit shown in FIG. 1 when the number of sensing cycles of the filter shown in FIG. 3 is a first value, according to an exemplary embodiment of the inventive concept.

Referring to FIGS. 6 and 7, after the sampling time Sampling, the reset signal RST of FIG. 6 has a pulse shape, but a reset signal RST of FIG. 7 maintains a high level after the sampling time Sampling. As shown in FIG. 7, since the reset switch 337 is turned on by the reset signal RST having a high level, charges integrated in the second capacitor C2 are discharged to a ground GND. That is, the filter 330 is reset. After the first sensing cycle T1, the switches 331 and 333 are turned off. As a result, power is not consumed due to switching operations of the switches 331 and 333.

FIG. 8 is a timing diagram illustrating an operation of the first sensing circuit shown in FIG. 1 when the number of sensing cycles of the filter shown in FIG. 3 is a second value, according to an exemplary embodiment of the inventive concept.

Referring to FIGS. 1 to 5, and 8, when it is determined that noise has been introduced into the first sensing circuit 210-1 in a previous frame by the controller 240, or when it is determined that noise introduced into the first sensing circuit 210-1 in the previous frame is a high noise, it is assumed that the controller 240 sets the number of sensing cycles of the filter 330 for a current frame to be equal to a second value. In an exemplary embodiment, the second value is a natural number equal to at least 3.

The controller 240 or firmware executed by the controller 240 may generate a reset signal RST and switch signals SW1 and SW2 shown in FIG. 8 for a current frame using the second value determined in a previous frame.

Before the first sensing cycle T1 is performed, the filter 330 is reset due to the activation of a reset signal RST. A reset operation is performed when the reset signal RST transitions from a high level to a low level. When a reset operation is performed, a sensing signal sensed by the touch sensor 101 is periodically supplied to the first sensing circuit 210-1 through the first sensing line SL1 by the first drive signal TX1 supplied to the first drive line DL1 in the first drive cycle DT1.

As the first drive signal TX1 oscillating in the first drive cycle DT1 is supplied to the first drive line DL1, a sensing signal sensed by the first touch sensor 101 is periodically supplied to the first comparator 310 through the first sensing line SL1 and the first pin 201-1 in the first sensing cycle T1.

The first comparator 310 periodically outputs a first output signal OUT1 having a swing width ΔV to the filter 330 in the first sensing cycle T1.

The filter 330 in the first sensing cycle T1 integrates the first output signals OUT1 periodically transmitted from the first comparator 310, and outputs a first integration signal SIG1 sampled at a sampling time Sampling as a second output signal OUT2-1 using the switches 331 and 333 operating according to switch signals SW1 and SW2 having waveforms shown in FIG. 8. The ADC 235 may convert the second output signal OUT2-1 (=SIG1) to an output digital signal OCODE, and the controller 240 may generate data corresponding to the output digital signal OCODE.

After the sampling time Sampling, the reset switch 337 is turned on due to activation of the reset signal RST. As a result, charges integrated in the second capacitor C2 are discharged to a ground GND. That is, the filter 330 is reset.

A sensing signal sensed by the touch sensor 101 is periodically supplied to the first sensing circuit 210-1 through the first sensing line SL1 by a first drive signal TX1 supplied to the first drive line DL1 in a second drive cycle DT2.

As the first drive signal TX1, which is oscillating, is supplied to the first drive line DL1 in the second drive cycle DT2, a sensing signal sensed by the first touch sensor 101 is periodically supplied to the first comparator 310 through the first sensing line SL1 and the first pin 201-1 in the second sensing cycle T2. The first comparator 310 periodically outputs a first output signal OUT1 having a swing width ΔV to the filter 330 in the second sensing cycle T2.

The filter 330 integrates the first output signal OUT1 periodically transmitted from the first comparator 310, and outputs a second integration signal SIG2 sampled at a sampling time Sampling as a second output signal OUT2-1 using the switches 331 and 333 operating according to the switch signals SW1 and SW2 in the second sensing cycle T2. The ADC 235 may convert the second output signal OUT2-1 (=SIG2) to an output digital signal OCODE, and the controller 240 may generate data corresponding to the output digital signal OCODE.

After the sampling time Sampling, the reset switch 337 is turned on due to activation of the reset signal RST. As a result, charges integrated in the second capacitor C2 are discharged to a ground GND. That is, the filter 330 is reset.

A sensing signal sensed by the touch sensor 101 is periodically supplied to the first sensing circuit 210-1 through the first sensing line SL1 by the first drive signal TX1 supplied to the first drive line DL1 in an $n^{th}$ drive cycle DTn.

As the first drive signal TX1, which is oscillating, is supplied to the first drive line DL1 in the $n^{th}$ drive cycle DTn, a sensing signal sensed by the first touch sensor 101 is periodically supplied to the first comparator 310 through the first sensing line SL1 and the first pin 201-1 in an $n^{th}$ sensing cycle Tn.

The first comparator 310 periodically outputs a first output signal OUT1 having a swing width ΔV to the filter 330 in the $n^{th}$ sensing cycle Tn. Respective sensing cycles T1 to Tn are equal to each other.

The filter 330 in the $n^{th}$ sensing cycle Tn integrates the first output signal OUT1 periodically transmitted from the first comparator 310, and outputs an $n^{th}$ integration signal SIGn sampled at a sampling time Sampling as the second output signal OUT2-1 using the switches 331 and 333 operating according to the switch signals SW1 and SW2. The ADC 235 may convert an $n^{th}$ output signals OUT2-1 (=SIGn) to an output digital signal OCODE, and the controller 240 may generate data corresponding to the output digital signal OCODE.

After the sampling time Sampling, the reset switch 337 is turned on due to activation of the reset signal RST. As a result, charges integrated in the second capacitor C2 are discharged to a ground GND. That is, the filter 330 is reset. After sampling is performed in each of the sensing cycles T1 to Tn, the filter 330 is reset. As shown in FIG. 6, 7, or 8, in an exemplary embodiment, the number of sensing cycles is the same as the number of drive cycles.

As shown in FIGS. 6, 7, and 8, it is assumed that the total time TT for controlling the number of sensing cycles is the same. Accordingly, the number of sensing cycles may be set to be 1 time as shown in FIGS. 6 and 7, and the number of sensing cycles may be set to be n times as shown in FIG. 8 in a range of the total time TT.

Figure 9:
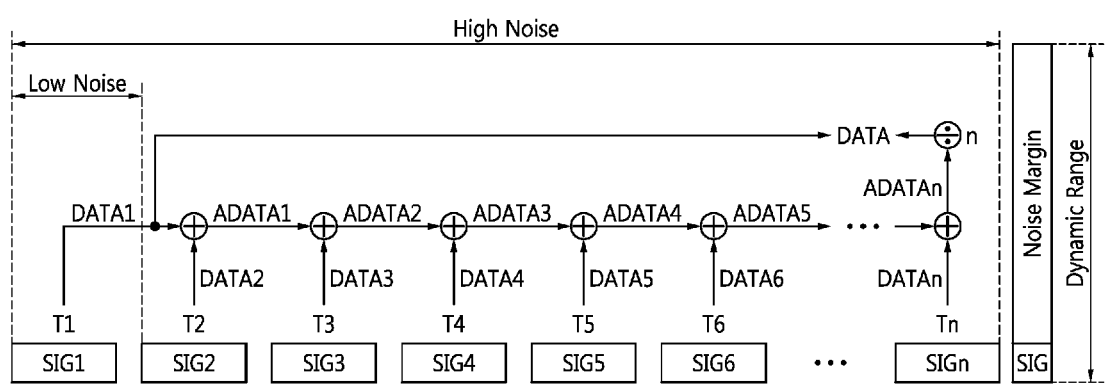
FIG. 9 is a conceptual diagram illustrating an operation and a dynamic range of the control logic circuit shown in FIG. 1 when the number of sensing cycles of the filter shown in FIG. 3 is a first value or a second value, according to an exemplary embodiment of the inventive concept.

FIG. 9 is a conceptual diagram illustrating an operation and a dynamic range of the control logic circuit shown in FIG. 1 when the number of sensing cycles of the filter shown in FIG. 3 is a first value or a second value, according to an exemplary embodiment of the inventive concept. Referring to FIGS. 1 to 9, in an exemplary embodiment, when noise is determined to be a low noise LN, the controller 240 outputs a first output digital signal OCODE (=DATA1) corresponding to the first integration signal SIG1 as output data DATA.

When noise is determined to be a high noise FIN, the controller 240 stores the first output digital signal OCODE (=DATA1) corresponding to the first integration signal SIG1 generated in the first sensing cycle T1 in the memory device 250 or in a memory device inside the controller 240. The controller 240 generates a first accumulation digital signal ADATA1 by accumulating a second output digital signal OCODE (=DATA2) corresponding to a second integration signal SIG2 generated in the second sensing cycle T2 and the first output digital signal OCODE (=DATA1) stored in the memory device 250 or a memory device inside the controller 240, and stores the first accumulation digital signal ADATA1 in the memory device 250 or the memory device inside the controller 240.

The controller 240 generates a second accumulation digital signal ADATA2 by accumulating a third output digital signal OCODE (=DATA3) corresponding to a third integration signal SIG3 generated in a third sensing cycle T3 and the first accumulation digital signal ADATA1 stored in the memory device 250 or the memory device inside the controller 240, and stores the second accumulation digital signal ADATA2 in the memory device 250 or the memory device inside the controller 240.

According to an exemplary embodiment as described above, the controller 240 sequentially accumulates each of output digital signals DATA4 to DATAn corresponding to each of integration signals SIG4 to SIGn generated in each of sensing cycles T4 to Tn and each of accumulation digital signals ADATA2 to ADATAn stored in the memory device 250 or the memory device inside the controller 240. The controller 240 may calculate a final digital signal by dividing a final accumulation digital signal ADATAn by the number of sensing cycles, and output the final digital signal as output data DATA.

Referring to FIG. 9, the filter 330 is reset by a reset signal RST in each of the sensing cycles T1 to Tn. As a result, charges stored in the second capacitor C2 of the filter 330 are discharged to a ground in each of the sensing cycles T1 to Tn. Accordingly, the second capacitor C2 of the filter 330 stores only each of the integration signals SIG1 to SIGn integrated in each of the sensing cycles T1 to Tn.

As a result, compared to a conventional filter which integrates all integration signals integrated in all of the sensing cycles, the filter 330 according to an exemplary embodiment of the present inventive concept stores only the integration signals SIG1 to SIGn integrated in each of the sensing cycles T1 to Tn, thereby increasing a noise margin of the filter 330 and an operation dynamic range of the filter 330.

Figure 10:
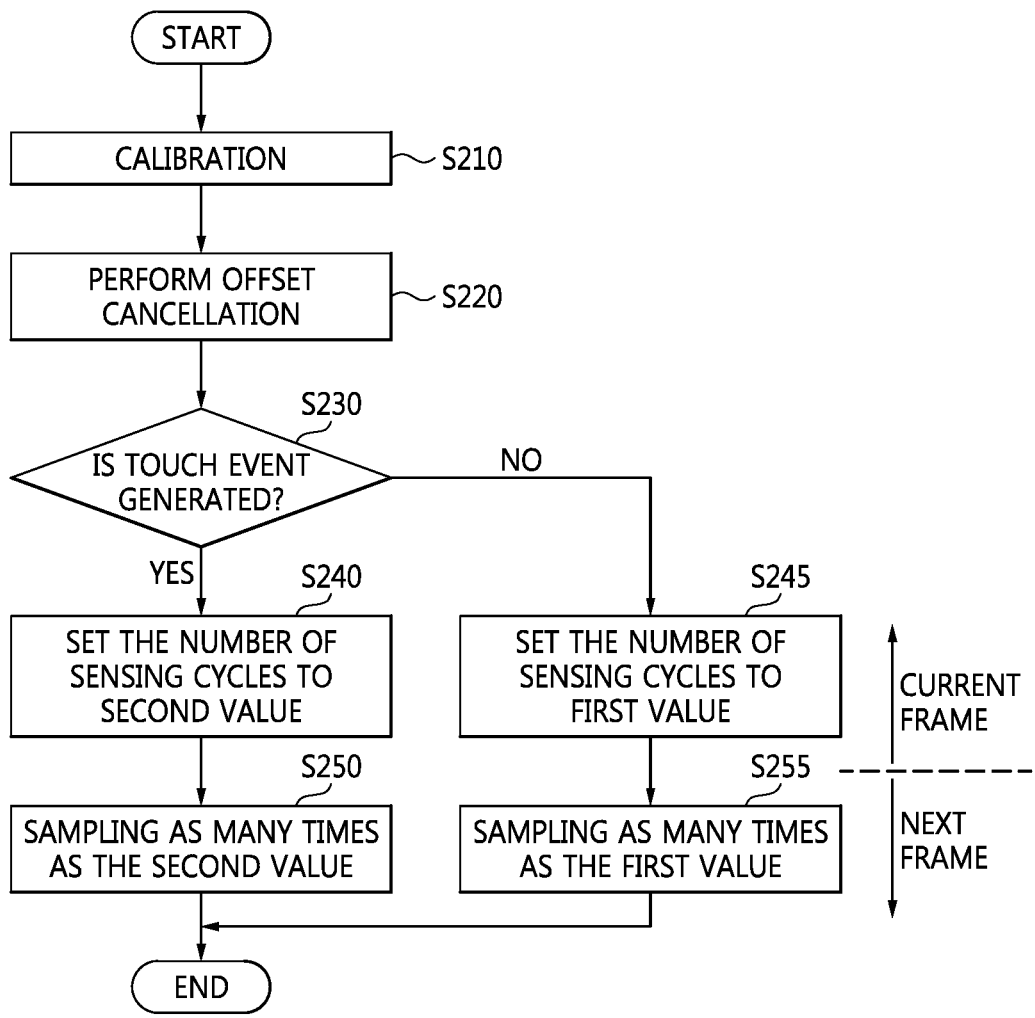
FIG. 10 is a flowchart illustrating an operation of the first sensing circuit shown in FIG. 1 according to an exemplary embodiment of the inventive concept.

FIG. 10 is a flowchart illustrating an operation of the first sensing circuit shown in FIG. 1 according to an exemplary embodiment of the inventive concept. Referring to FIGS. 1 to 10, a calibration operation for the first sensing circuit 210-1 is performed (S210), and an offset capacitance canceling operation is performed (S220).

According to exemplary embodiments, operations S210 and S220 may be performed simultaneously or sequentially, and performance of the operations may or may not overlap. According to exemplary embodiments, operation S210 may be performed prior to operation S220, or operation S220 may be performed prior to operation S210. According to exemplary embodiments, the calibration operation S210 may be omitted (e.g., the calibration operation S210 may be performed in advance).

As described above, in an exemplary embodiment, after the offset capacitance canceling operation S220 is completed (e.g., after booting), the first comparator 310 receives and compares a reference signal and a sensing signal output from the sensing line SL1, and generates a first output signal OUT1. The filter 330 generates a second output signal OUT2-1 by integrating the first output signal OUT1 in each sensing cycle (for example, a sensing cycle set for a previous frame). The selection circuit 230 outputs the second output signal OUT2-1 to the ADC 235 in response to the selection signals SEL.

The ADC 235 converts the second output signal OUT2-1 to an output digital signal OCODE. The control logic circuit 240 determines at least one of whether noise is generated and whether a touch event is generated based on the reference digital signal RCODE and a digital signal OCODE output from the ADC 230, and adjusts the number of sensing cycles of the filter 330 based on a result of the determination.

The control logic circuit 240 determines whether a touch event is generated based on the reference digital signal RCODE and the digital signal OCODE corresponding to the second output signal OUT2-1 (S230). When it is determined that the touch event is not generated, the reference digital signal RCODE is equal to the digital signal OCODE corresponding to the second output signal OUT2-1. When it is determined that the touch event is generated, the reference digital signal RCODE is not equal to the digital signal OCODE corresponding to the second output signal OUT2-1.

When it is determined that the touch event is generated at S230, the controller 240 sets the number of sensing cycles of the filter 330 (for example, the number of sensing cycles for a next frame) to a second value (S240). Accordingly, the filter 330 performs a sampling operation as many times as the second value in a next frame (S250). That is, in an exemplary embodiment, when it is determined that the touch event is generated, the number of times that the sampling operation is performed is equal to the second value.

When it is determined that the touch event is not generated at S230, the controller 240 sets the number of sensing cycles of the filter 330 (for example, the number of sensing cycles for a next frame) to a first value (S245). Accordingly, the filter 330 performs a sampling operation as many times as the first value in a next frame (S255). That is, in an exemplary embodiment, when it is determined that touch event is not generated, the number of times that the sampling operation is performed is equal to the first value. The first value is smaller than the second value.

When it is determined that the touch event is not generated at operation S230, the filter 330 performs a filtering operation (for example, an integration operation) as many times as the number of sensing cycles corresponding to the first value, which is smaller than the second value, thereby reducing the power consumed by the touch screen controller 200.

A touch screen controller including a filter according to an exemplary embodiment of the present inventive concept allows the number of sensing cycles of the filter to be adjusted according to whether an external noise is detected.

According to exemplary embodiments, the touch screen controller can adaptively adjust characteristics of the filter (e.g., the number of the sensing cycles), thereby reducing the power consumption of the touch screen controller.

According to exemplary embodiments, the touch screen controller can process new data in each sensing cycle, thereby increasing an operation dynamic range. The touch screen controller can adaptively adjust characteristics of the filter (e.g., the number of the sensing cycles), thereby providing an improved filter having a decreased size.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A touch screen controller configured to control a capacitive touch screen, the touch screen controller comprising:
   a first comparator configured to compare a reference signal with a sensing signal, and generate a first output signal,
   wherein the capacitive touch screen comprises a plurality of capacitive touch sensors connected to a sensing line and a drive line, the capacitive touch sensors are configured to sense a touch event, and the sensing signal is output from the sensing line;
   a filter configured to generate a second output signal by integrating the first output signal in each of a plurality of sensing cycles of the filter;
   an analog-to-digital converter (ADC) configured to convert the second output signal to a digital signal; and
   a controller configured to determine at least one of whether a noise is generated and whether the touch event is generated based on a reference digital signal and the digital signal, and adjust a number of the sensing cycles of the filter based on a result of the determination,
   wherein the controller is configured to set the number of the sensing cycles to a first value in response to determining that the noise is not generated, and set the number of the sensing cycles to a second value in response to determining that the noise is generated, wherein the first value is smaller than the second value.

2. The touch screen controller of claim 1, wherein the controller is configured to set the number of the sensing cycles to a third value in response to determining that the noise generated is present in a window defined by reference values, and set the number of the sensing cycles to a fourth value in response to determining that the noise generated is present outside the window, wherein the third value is smaller than the fourth value.

3. The touch screen controller of claim 1, wherein the controller is configured to set the number of the sensing cycles to a third value in response to determining that the touch event is not generated, and set the number of the sensing cycles to a fourth value in response to determining that the touch event is generated, wherein the third value is smaller than the fourth value.

4. The touch screen controller of claim 1, further comprising:
   a drive circuit configured to transmit a plurality of drive pulses to the drive line in each of a plurality of drive cycles,
   wherein the controller is configured to output a control signal to the drive circuit based on the result of the determination, and the drive circuit is configured to adjust a number of the drive cycles in response to the control signal.

5. The touch screen controller of claim 4, wherein the number of the sensing cycles is equal to the number of the drive cycles.

6. The touch screen controller of claim 4, wherein the controller is configured to set the number of the drive cycles to a first value using the control signal in response to determining that the noise generated is present in a window defined by reference values, and set the number of the drive cycles to a second value using the control signal in response to determining that the noise generated is present outside the window, wherein the first value is smaller than the second value.

7. The touch screen controller of claim 1, wherein the filter comprises:
   a first capacitor comprising a first terminal connected to an output terminal of the first comparator;
   a first switch connected between a second terminal of the first capacitor and a ground;
   a second comparator comprising a first input terminal and a second input terminal;
   a second switch connected between the second terminal of the first capacitor and the first input terminal of the second comparator;
   a second capacitor connected between the first input terminal of the second comparator and an output terminal of the second comparator; and
   a reset switch connected to the second capacitor in parallel, wherein a total number of times that each of the first switch, the second switch, and the reset switch is toggled is determined according to the number of the sensing cycles.

8. The touch screen controller of claim 1, wherein
the ADC is configured to convert the second output signal output from the filter to the digital signal in each of the sensing cycles, and
the controller is configured to accumulate the digital signals output from the ADC in the sensing cycles, and generate a final digital signal by dividing the accumulated digital signals by the number of the sensing cycles.

9. The touch screen controller of claim 1, wherein the controller is configured to determine at least one of whether the noise is generated and whether the touch event is generated based on the reference digital signal and the digital signal of a current frame, and adjust the number of the sensing cycles for a next frame based on a result of the determination.

10. A touch screen system, comprising:
a capacitive touch screen comprising a plurality of capacitive touch sensors connected to a sensing line and a drive line; and
a touch screen controller electrically connected to the capacitive touch screen, wherein the touch screen controller comprises:
a first comparator configured to compare a reference signal with a sensing signal output from the sensing line, and generate a first output signal;
a filter configured to generate a second output signal by integrating the first output signal in each of a plurality of sensing cycles of the filter;
an analog-to-digital converter (ADC) configured to convert the second output signal to a digital signal; and
a controller configured to determine at least one of whether a noise is generated and whether the touch event is generated based on a reference digital signal and the digital signal, and adjust a number of the sensing cycles based on a result of the determination,
wherein the controller is configured to set the number of the sensing cycles to a first value in response to determining that the noise is not generated, and set the number of the sensing cycles to a second value in response to determining that the noise is generated, wherein the first value is smaller than the second value.

11. The touch screen system of claim 10, wherein the controller is configured to set the number of the sensing cycles to a third value in response to determining that the noise generated is present in a window defined by reference values, and set the number of the sensing cycles to a fourth value in response to determining that the noise generated is present outside the window, wherein the third value is smaller than the fourth value.

12. The touch screen system of claim 10, wherein the controller is configured to set the number of the sensing cycles to a third value in response to determining that the touch event is not generated, and set the number of the sensing cycles to a fourth value in response to determining that the touch event is generated, wherein the third value is smaller than the fourth value.

13. The touch screen system of claim 10, further comprising:
a drive circuit configured to transmit a plurality of drive pulses to the drive line in each of a plurality of drive cycles,
wherein the controller is configured to output a control signal to the drive circuit based on the result of the determination, and the drive circuit is configured to adjust a number of the drive cycles in response to the control signal.

14. The touch screen system of claim 13, wherein the controller is configured to set the number of the drive cycles to a third value using the control signal in response to determining that the noise generated is present in a window defined by reference values, and set the number of the drive cycles to a fourth value using the control signal in response to determining that the noise generated is present outside the window, wherein the third value is smaller than the fourth value.

15. The touch screen system of claim 10, wherein the filter comprises:
a first capacitor comprising a first terminal connected to an output terminal of the first comparator;
a first switch connected between a second terminal of the first capacitor and a ground;
a second comparator comprising a first input terminal and a second input terminal;
a second switch connected between the second terminal of the first capacitor and the first input terminal of the second comparator;
a second capacitor connected between the first input terminal of the second comparator and an output terminal of the second comparator; and
a reset switch connected to the second capacitor in parallel,
wherein a total number of times that each of the first switch, the second switch, and the reset switch is toggled is determined according to the number of the sensing cycles.

16. The touch screen system of claim 10, wherein
the ADC is configured to convert the second output signal output from the filter to the digital signal in each of the sensing cycles, and
the controller is configured to accumulate the digital signals output from the ADC in the sensing cycles, and generate a final digital signal by dividing the accumulated digital signals by the number of the sensing cycles.

17. A touch screen system, comprising:
a capacitive touch screen comprising a plurality of capacitive touch sensors connected to a sensing line and a drive line; and
a touch screen controller connected to the capacitive touch screen through the sensing line and the drive line,
wherein the touch screen controller comprises:
a first comparator configured to compare a reference signal with a sensing signal output from the sensing line in each first sensing cycle of a current frame, and generate a first output signal;
a filter configured to generate a second output signal by integrating the first output signal in the each first sensing cycle;
a drive circuit configure to drive driving pulses to the drive line in each first driving cycle of the current frame;
an analog-to-digital converter (ADC) configured to convert the second output signal to a digital signal in the each first sensing cycle; and
a controller configured to determine at least one of whether a noise is generated and whether a touch event is generated based on a reference digital signal and the digital signal of the current frame, and adjust at least one of a number of second sensing cycles of a next frame and a number of second driving cycles of the next frame based on a result of the determination,
wherein the controller is configured to set the number of the second sensing cycles to a first value in response to determining that the noise is not generated, and set the number of the second sensing cycles to a second value in response to determining that the noise is generated, wherein the first value is smaller than the second value.

18. The touch screen system of claim 17, wherein the controller is configured to set the number of the second sensing cycles to a third value in response to determining that the noise generated is present in a window defined by reference values, and set the number of the second sensing cycles to a fourth value in response to determining that the noise generated is present outside the window, wherein the third value is smaller than the fourth value.

\* \* \* \* \*